United States Patent
Yamada (10) Patent No.: US 9,727,041 B2
(45) Date of Patent: Aug. 8, 2017

(54) AIR-CONDITIONING SYSTEM AND CENTRAL MANAGEMENT APPARATUS

(71) Applicant: Hirohisa Yamada, Tokyo (JP)

(72) Inventor: Hirohisa Yamada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 213 days.

(21) Appl. No.: 14/432,523

(22) PCT Filed: Nov. 13, 2012

(86) PCT No.: PCT/JP2012/079374
§ 371 (c)(1),
(2) Date: Mar. 31, 2015

(87) PCT Pub. No.: WO2014/076756
PCT Pub. Date: May 22, 2014

(65) Prior Publication Data
US 2015/0277409 A1 Oct. 1, 2015

(51) Int. Cl.
*G05B 13/00* (2006.01)
*G05B 19/042* (2006.01)
(Continued)

(52) U.S. Cl.
CPC .......... *G05B 19/042* (2013.01); *F24F 11/006* (2013.01); *F24F 11/0034* (2013.01);
(Continued)

(58) Field of Classification Search
CPC .......... G05B 15/02; G05B 2219/2642; G05B 13/0265; F24F 11/006; F24F 11/0086;
(Continued)

(56) References Cited

U.S. PATENT DOCUMENTS 6,498,955 B1 * 12/2002 McCarthy .......... G05B 13/0265
700/1
7,761,460 B1 * 7/2010 Hall .................. G06F 17/30569
707/756
(Continued)

FOREIGN PATENT DOCUMENTS

JP  H04-259794 A  9/1992
JP  2000-121126 A  4/2000
(Continued)

OTHER PUBLICATIONS

Office Action issued Mar. 15, 2016 in the corresponding JP application No. 2014-546755 (with English translation).
(Continued)

*Primary Examiner* — Darrin Dunn
(74) *Attorney, Agent, or Firm* — Posz Law Group, PLC (57) ABSTRACT

An air-conditioning system includes an air-conditioning apparatus, a user information input terminal, and a central management apparatus. The user information input terminal detects entrance of a user into a room and transmits an entrance-interlocking signal including user identification information for identifying the user to the central management apparatus. Upon receipt of the entrance-interlocking signal, the central management apparatus determines a control objective of the air-conditioning apparatus according to priority of user attribute of one or more users in the room and an energy saving level currently set, and cause the air-conditioning apparatus to perform an interlocking control in accordance with the determined control objective.

12 Claims, 7 Drawing Sheets

(51) Int. Cl.
  *F24F 11/00* (2006.01)
  *G05D 23/19* (2006.01)
  *G05B 15/02* (2006.01)

(52) U.S. Cl.
  CPC ......... *G05B 15/02* (2013.01); *G05D 23/1902* (2013.01); *F24F 2011/0035* (2013.01); *F24F 2011/0036* (2013.01); *F24F 2011/0063* (2013.01); *F24F 2011/0064* (2013.01); *F24F 2011/0067* (2013.01); *F24F 2011/0068* (2013.01); *F24F 2011/0075* (2013.01); *F24F 2011/0094* (2013.01); *G05B 2219/2614* (2013.01)

(58) Field of Classification Search
  CPC .......... F24F 2011/0091; F24F 11/0034; F24F 2011/0063
  See application file for complete search history.

(56) References Cited

U.S. PATENT DOCUMENTS

| | | | | |
|---|---|---|---|---|
| 7,864,058 | B2 * | 1/2011 | Kondo | G08B 21/0275 340/539.13 |
| 2003/0039380 | A1 * | 2/2003 | Sukegawa | G06K 9/6255 382/118 |
| 2003/0096572 | A1 * | 5/2003 | Gutta | F24F 11/0034 454/229 |
| 2007/0092279 | A1 * | 4/2007 | Nishizawa | H04N 1/0035 399/70 |
| 2007/0138307 | A1 * | 6/2007 | Khoo | F24F 11/006 236/1 C |
| 2007/0247321 | A1 * | 10/2007 | Okamoto | G06Q 10/08 340/573.1 |
| 2008/0029594 | A1 * | 2/2008 | Wada | G06Q 20/045 235/382 |
| 2008/0223927 | A1 * | 9/2008 | Otaka | G07C 9/00111 235/382 |
| 2009/0021381 | A1 * | 1/2009 | Kondo | G08B 21/0275 340/573.1 |
| 2009/0116700 | A1 * | 5/2009 | Wakabayashi | G06Q 20/3821 382/115 |
| 2009/0146817 | A1 * | 6/2009 | Ikeda | G07C 9/00111 340/572.1 |
| 2010/0157062 | A1 * | 6/2010 | Baba | G07C 9/00111 348/156 |
| 2010/0235004 | A1 * | 9/2010 | Thind | G05B 15/02 700/277 |
| 2010/0287568 | A1 * | 11/2010 | Sundararaman | G06Q 10/00 719/318 |
| 2010/0318226 | A1 * | 12/2010 | Augusto | F24F 3/00 700/277 |
| 2011/0087377 | A1 * | 4/2011 | Nabeshima | G05B 15/02 700/276 |
| 2011/0248822 | A1 * | 10/2011 | Sarihan | H04N 7/15 340/5.81 |
| 2012/0158775 | A1 * | 6/2012 | Choi | G06F 17/30997 707/769 |
| 2012/0159336 | A1 * | 6/2012 | Norwood | G06F 3/0482 715/733 |
| 2012/0222667 | A1 * | 9/2012 | Vendramini | F24B 1/191 126/502 |
| 2013/0063581 | A1 * | 3/2013 | Komatsu | G06K 9/00926 348/77 |
| 2013/0069542 | A1 * | 3/2013 | Curasi | H05B 37/0218 315/155 |
| 2013/0073681 | A1 * | 3/2013 | Jiang | G06N 3/006 709/218 |
| 2013/0097671 | A1 * | 4/2013 | Fouchard | H04L 12/2838 726/3 |
| 2014/0098397 | A1 * | 4/2014 | Oami | G06Q 10/06 358/1.14 |
| 2014/0297057 | A1 * | 10/2014 | Tanaka | F25B 13/00 700/300 |
| 2014/0358292 | A1 * | 12/2014 | Bradley | F24F 11/0034 700/276 |
| 2014/0365017 | A1 * | 12/2014 | Hanna | F24F 11/001 700/276 |
| 2015/0247646 | A1 * | 9/2015 | Song | F24F 11/006 700/276 |
| 2016/0138819 | A1 * | 5/2016 | Vega | F24F 11/006 700/276 |
| 2016/0201934 | A1 * | 7/2016 | Hester | F24F 11/006 700/276 |
| 2016/0202677 | A1 * | 7/2016 | Trundle | F24F 11/0086 700/275 |

FOREIGN PATENT DOCUMENTS

| | | |
|---|---|---|
| JP | 2005-110168 A | 4/2005 |
| JP | 2005-172288 A | 6/2005 |
| JP | 2007-132621 A | 5/2007 |
| JP | 2008-234615 A | 10/2008 |
| JP | 2012-163277 A | 8/2012 |

OTHER PUBLICATIONS

International Search Report of the International Searching Authority mailed Dec. 18, 2012 for the corresponding international application No. PCT/JP2012/079374 (and English translation).

* cited by examiner

| USER NAME | USER IDENTIFICATION INFORMATION | USER ATTRIBUTE | ENTRANCE PERMITTED AREA |
|---|---|---|---|
| ○○ ○○ | ID_11111111 | GENERAL EMPLOYEE | CONFERENCE ROOM A,B |
| △△ △△ | ID_33333333 | GENERAL EMPLOYEE | CONFERENCE ROOM A |
| □□ □□ | ID_44444444 | PRESIDENT | CONFERENCE ROOM A,B RECEPTION ROOM |
| ▽▽ ▽▽ | ID_55555555 | VIP | RECEPTION ROOM |
| : | : | : | : |

F I G. 4

| TERMINAL IDENTIFICATION INFORMATION | AREA | CORRESPONDING INDOOR UNIT NUMBER |
|---|---|---|
| e_11111111 | CONFERENCE ROOM A | IC_01, IC_02 |
| e_22222222 | CONFERENCE ROOM B | IC_03, IC_04 |
| e_33333333 | RECEPTION ROOM | IC_05, IC_06 |
| : | : | : |

F I G. 5

| USER ATTRIBUTE | PRIORITY |
|---|---|
| GENERAL EMPLOYEE | 1 |
| PRESIDENT | 2 |
| VIP | 3 |

F I G. 6

| PRIORITY ORDER | USER ATTRIBUTE |
|---|---|
| 1 | PRESIDENT |
| 2 | GENERAL EMPLOYEE |
| 3 | — |

FIG. 7

| USER ATTRIBUTE | AUTHENTICATION IN SUMMER | AUTHENTICATION IN WINTER |
|---|---|---|
| GENERAL EMPLOYEE | COOLING 28°C ON | HEATING 20°C ON |
| PRESIDENT | COOLING 26°C ON | HEATING 22°C ON |
| VIP | COOLING 24°C ON | HEATING 24°C ON |

FIG. 8

| | ENERGY SAVING MODE SETTING (FOR COOLING) | | | |
|---|---|---|---|---|
| PRIORITY ORDER | OFF | LEVEL 1 | LEVEL 2 | LEVEL 3 |
| 1 | TARGET TEMPERATURE PRESET BY USER | ATTRIBUTE-SPECIFIC TARGET TEMPERATURE | ATTRIBUTE-SPECIFIC TARGET TEMPERATURE +1°C | ATTRIBUTE-SPECIFIC TARGET TEMPERATURE +2°C |
| 2 | | ATTRIBUTE-SPECIFIC TARGET TEMPERATURE +1°C | ATTRIBUTE-SPECIFIC TARGET TEMPERATURE +2°C | VENTILATION |
| 3 | | ATTRIBUTE-SPECIFIC TARGET TEMPERATURE +2°C | VENTILATION | OFF |

FIG. 9

| TERMINAL IDENTIFICATION INFORMATION | USER IDENTIFICATION INFORMATION | USER ATTRIBUTE |
|---|---|---|
| e_11111111 | e_44444444 | PRESIDENT |
| e_22222222 | e_11111111 | GENERAL EMPLOYEE |
| : | : | : |

[BEFORE VIP USER ENTRANCE]

| PRIORITY ORDER | USER ATTRIBUTE |
|---|---|
| 1 | PRESIDENT |
| 2 | GENERAL EMPLOYEE |
| 3 | – |

⇒

[AFTER VIP USER ENTRANCE]

| PRIORITY ORDER | USER ATTRIBUTE |
|---|---|
| 1 | VIP USER |
| 2 | PRESIDENT |
| 3 | GENERAL EMPLOYEE |

FIG. 13

| OPERATION | RECEPTION ROOM | CONFERENCE ROOM A | CONFERENCE ROOM B |
|---|---|---|---|
| ENERGY SAVING LEVEL 1 | OFF | 27°C(26°C+1°C) | 28°C |
| ⇓ | ⇓ | ⇓ | ⇓ |
| AFTER VIP USER ENTRANCE | 25°C(24°C+1°C) | 28°C(26°C+2°C) | VENTILATION |
| ⇓ | ⇓ | ⇓ | ⇓ |
| VIP USER LEAVES | OFF | 27°C(26°C+1°C) | 28°C |
| ⇓ | ⇓ | ⇓ | ⇓ |
| PRESIDENT MOVES FROM CONFERENCE ROOM A TO CONFERENCE ROOM B | OFF | OFF | 27°C(26°C+1°C) |
| ⇓ | ⇓ | ⇓ | ⇓ |
| SWITCH TO ENERGY SAVING LEVEL 1 | OFF | OFF | 26°C |

AIR-CONDITIONING SYSTEM AND CENTRAL MANAGEMENT APPARATUS

CROSS REFERENCE TO RELATED APPLICATION

This application is a U.S. national stage application of PCT/JP2012/079374 filed on Nov. 13, 2012, the contents of which are incorporated herein by reference.

TECHNICAL FIELD

The present invention relates to an air-conditioning system and a central management apparatus.

BACKGROUND

A interlocking control has so far been known in which a device (interlocked device) is operated according to a signal indicating an operation of another device (trigger device). The interlocking control is applicable to an air-conditioning system, so as to control operations of air-conditioning apparatuses in linkage with the trigger device (see, for example, Patent Literature 1). Patent Literature 1 discloses, as an example of the interlocking control, a method of turning off all indoor units in a conference room when the conference room is locked, and turning on all the indoor units in the conference room when one of the indoor units in the conference room is turned on.

In addition, an air-conditioning system has been disclosed to which the interlocking control is applied such that a person identification device is employed as the trigger device, and the air-conditioning apparatus is set to a temperature that suits the preference of the person in accordance with the identification result of the trigger device (see, for example, Patent Literature 2).

PATENT LITERATURE

Patent Literature 1: Japanese Unexamined Patent Application Publication No. 2005-110168 (FIG. 1, FIG. 14, paragraphs [0061], [0092])

Patent Literature 2: Japanese Unexamined Patent Application Publication No. 2005-172288 (FIG. 1, paragraph [0033])

According to Patent Literature 1, the interlocking control with respect to the interlocked device is performed in the same way irrespective of who of the users operates the trigger device (room key or indoor unit), and hence an interlocking setting for each of the users cannot be performed. In such an aspect, the technique according to Patent Literature 2 has an advantage since different interlocking settings can be specified for different users.

However, Patent Literature 2 only teaches controlling the environment to the preference of the user, without any reference to energy-saving control which constitutes a key issue in the recent development of the air-conditioning system, and is hence unable to provide an energy saving measure.

The present invention has been accomplished in view of the foregoing problem, and provides an air-conditioning system and a central management apparatus designed to perform an interlocking control suitable for each user with an air-conditioning apparatus, while providing an energy saving measure.

SUMMARY

In an aspect, the present invention provides an air-conditioning system including an air-conditioning apparatus that performs air-conditioning of a room; an entrance-interlocking trigger device that detects entrance of a user into the room and transmits an entrance-interlocking signal including user identification information for identifying the user; and a central management apparatus that receives the entrance-interlocking signal and controls the air-conditioning apparatus based on the entrance-interlocking signal. The central management apparatus includes a user information database storing user attributes associated with the user identification information; an interlocking setting database group including a priority database storing priority levels associated with the respective user attributes, an attribute interlocking database storing attribute-specific preset temperatures associated with the respective user attributes, and an energy saving mode setting database storing one or more energy saving levels each specifying a preset temperature of the room based on the attribute-specific preset temperature as a control objective of the air-conditioning apparatus; a setting input unit for selecting the energy saving level; and an interlocking control calculation unit. The interlocking control calculation unit is configured to identify, upon detecting the entrance of a new user into the room based on the entrance-interlocking signal from the entrance-interlocking trigger device, the user attribute of the user who has newly entered the room and each of one or more users present in the room based on the user information database; determine, based on the interlocking setting database group, the priority level of each of the one or more user attributes that have been identified, and identify the attribute-specific setting information corresponding to the user attribute of a highest priority, thereby determining the control objective according to the energy saving level selected by the setting input unit; and transmit an air-conditioning apparatus control signal indicating the determined control objective, to the air-conditioning apparatus.

The foregoing configuration according to the present invention allows the air-conditioning system to perform the interlocking control suitable for each of the users with respect to the air-conditioning apparatus, while providing an energy saving measure.

DETAILED DESCRIPTION

Figure 1:
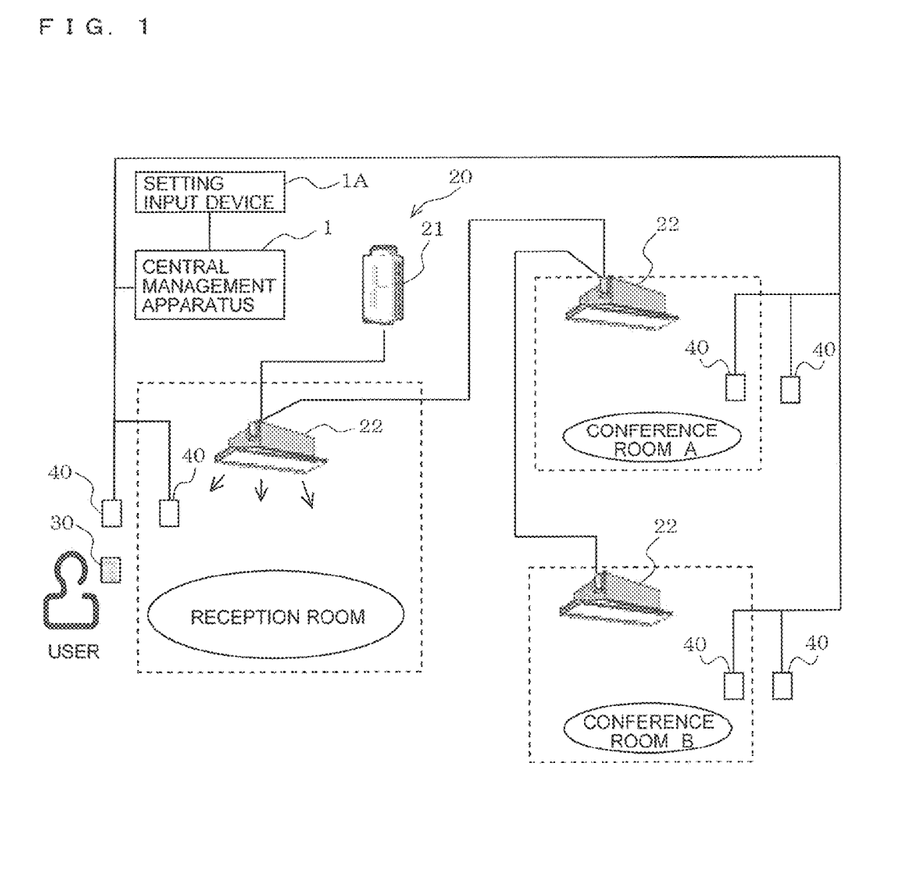
FIG. 1 is a schematic drawing showing a configuration of an air-conditioning system according to Embodiment of the present invention.

FIG. 1 is a schematic drawing showing a configuration of an air-conditioning system according to Embodiment of the present invention.

As shown in FIG. 1, the air-conditioning system according to Embodiment includes a central management apparatus 1, an air-conditioning apparatus 20 including an outdoor unit 21 and indoor units 22, and a user information input terminal 40. The building in which the air-conditioning system is installed includes a plurality of rooms, and it will hereinafter be assumed that the building includes a reception room, a conference room A, and a conference room B, and that one indoor unit 22 is provided in each of the rooms. The number of indoor units 22 to be provided in each room may be changed as desired according to the size of the room or other factors.

The central management apparatus 1 serves to control the entirety of the air-conditioning system, and a setting input device 1A serving as an input device, as well as to the outdoor unit 21 via a communication transmission line. In addition, the user information input terminal 40 is connected to the central management apparatus 1, so that the central management apparatus 1 can acquire information inputted through the user information input terminal 40.

The setting input device 1A is constituted of, for example, a touch panel input device used in combination with a keyboard, a mouse, and a display screen. The setting input device 1A is used for inputting setting of various databases to be subsequently described, setting of an energy saving level to be subsequently described, setting of a season indicating whether it is summer time or winter time, and so forth. The input of such settings through the setting input device 1A is performed, for example, by the system manager.

The user information input terminal 40 is herein exemplified by a card reader, and reads out user identification information (ID number in Embodiment) stored in a user information card 30 given in advance to each user. The user information input terminal 40 is provided on each of the entrance side and exit side of the door of a reception room, a conference room A, and a conference room B, to acquire user identification information of users entering and leaving each of the rooms.

The user information input terminal 40 provided on the entrance side transmits an entrance-interlocking signal including the user identification information acquired from the user information card 30, its own terminal identification information, and trigger information to be subsequently described, to the central management apparatus 1. The user information input terminal 40 provided on the exit side transmits an exit-interlocking signal including the user identification information acquired from the user information card 30, its own terminal identification information, and including the trigger information to be subsequently described, to the central management apparatus 1. In addition, the user information input terminal 40 locks and unlocks an electric lock of the room for which the user information input terminal 40 is provided. The electric lock may be arranged so as to be automatically locked when the door thus far opened is closed. The user information input terminal 40 corresponds to the entrance-interlocking trigger device and the exit-interlocking trigger device in the present invention.

The user information card 30 used with the user information input terminal 40 is herein exemplified by a wireless IC card. The user information card 30 may be a magnetic card instead of the wireless IC card. In addition, although the card is herein employed for identifying the user with the user information input terminal 40, the user's PIN code, fingerprint, or voice may be input, or the users face image shot by a camera may be utilized instead of the card. Further, different user identification methods may be adopted on the entrance side and the exit side of the room, such that the card is used for the user information input terminal 40 on the entrance side and the user's face image shot by a camera is used for the user information input terminal 40 on the exit side.

Figure 2:
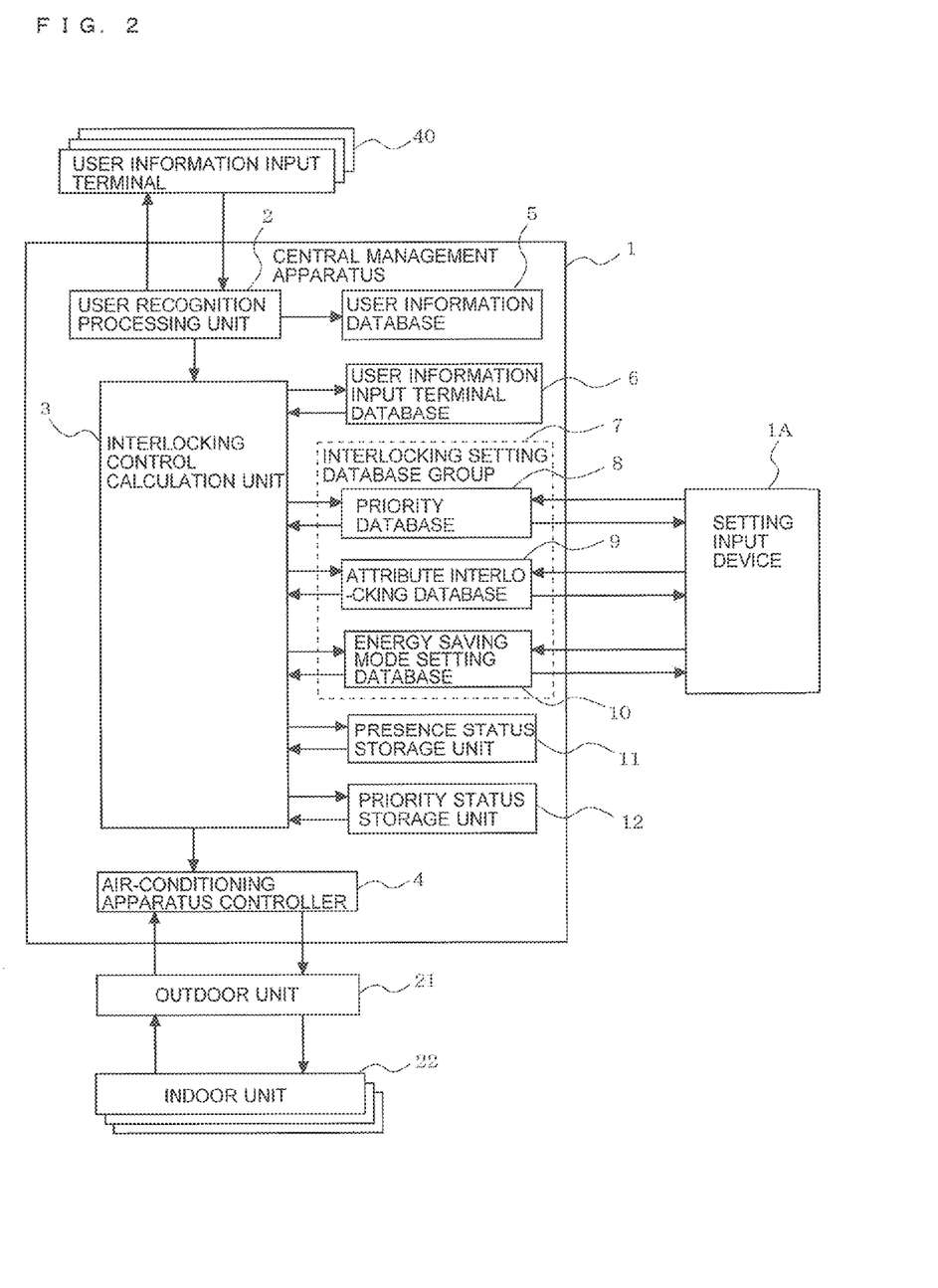
FIG. 2 is a block diagram of the air-conditioning system according to Embodiment of the present invention.

FIG. 2 is a block diagram of the air-conditioning system according to Embodiment of the present invention. In FIG. 2, the same constituents as those of FIG. 1 are denoted by the same numeral.

As shown in FIG. 2, the central management apparatus 1 includes a user recognition processing unit 2, an interlocking control calculation unit 3, an air-conditioning apparatus controller 4, a user information database 5, a user information input terminal database 6, an interlocking setting database group 7, a presence status storage unit 11, and a priority status storage unit 12. The interlocking setting database group 7 includes a priority database 8, an attribute interlocking database 9, and an energy saving mode setting database 10.

Operations of the above-cited units of the central management apparatus 1 will be subsequently described in relation to the operation of the air-conditioning system. Hereunder, the databases will first be described.

Figure 3:
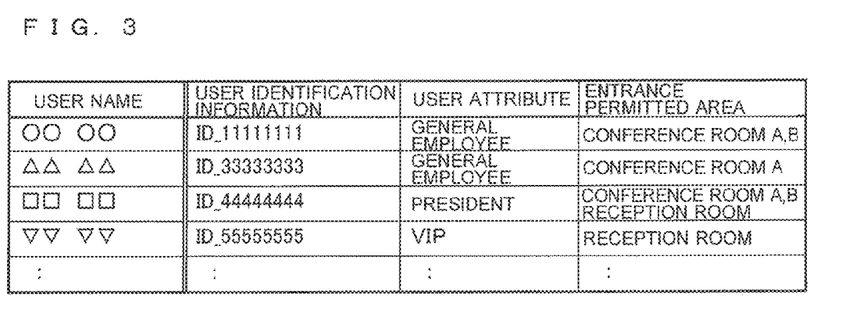
FIG. 3 is a table showing an example of contents of a user information database 5 in the central management apparatus 1 in FIG. 1.

FIG. 3 is a table showing an example of contents of the user information database 5 in the central management apparatus 1 in FIG. 1.

The user information database 5 contains "user name", "user identification information", "user attribute", and "entrance-permitted area". "User identification information" represents the ID allocated to each user. "User attribute" is herein classified as "general employee", "president", and "VIP". "VIP" corresponds, for example, to an important visitor. The user attribute classified as above is merely exemplary, and desired properties may be introduced depending on the environment of use. For example, the general employee may further be classified into "general employee (group A)" and "general employee (group B)", so as to specify four properties in total.

In "entrance-permitted area", the area where the user identified by "user identification information" is permitted to enter is registered. The registration of data in the user information database 5 may be performed by the system manger in the form of pre-registration, or at the time of entrance to the building. The registration method of the user information is not limited to the above, but may be modified as desired depending on the environment of use.

Figure 4:
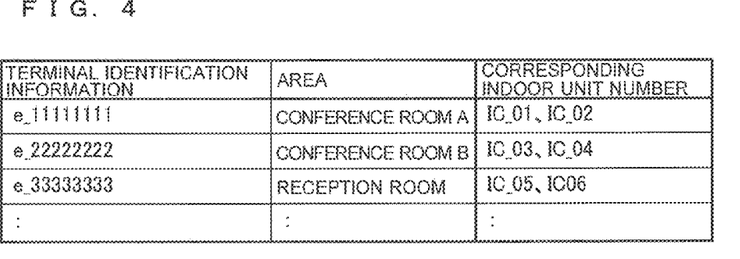
FIG. 4 is a table showing an example of contents of a user information input terminal database 6 in the central management apparatus 1 in FIG. 1.

FIG. 4 is a table showing an example of contents of the user information input terminal database 6 in the central management apparatus 1 in FIG. 1.

The user information input terminal database 6 contains "terminal identification information", "area", and "corresponding indoor unit number". "Terminal identification information" represents the ID number allocated in advance to each of the user information input terminals 40. "Area" represents the rooms where the user information input terminal 40 identified by "terminal identification information" is provided. "Corresponding indoor unit number" represents the number of the indoor unit 22 installed in the room identified by "area".

Figure 5:
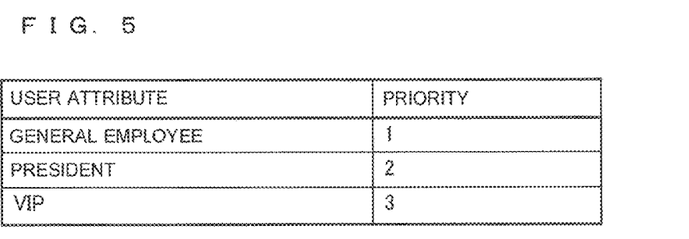
FIG. 5 is a table showing an example of contents of a priority database 8 in the central management apparatus 1 in FIG. 1.

FIG. 5 is a table showing an example of contents of the priority database 8 in the central management apparatus 1 in FIG. 1.

The priority database 8 contains the priority of each user attribute. In this example, the larger numeral represents the higher priority. In other words, the order of priority is the VIP, the president, and the general employee.

Figure 6:
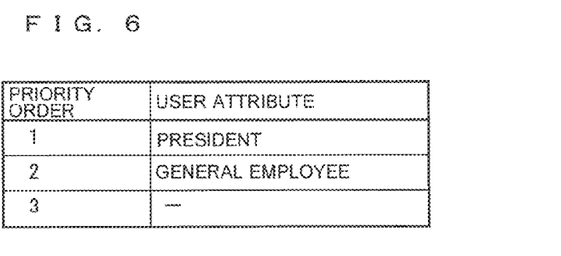
FIG. 6 is a table showing an example of contents of a priority status storage unit 12 in the central management apparatus 1 in FIG. 1.

FIG. 6 is a table showing an example of contents of the priority status storage unit 12 in the central management apparatus 1 in FIG. 1.

The priority status storage unit 12 stores therein the priority status of the persons present in the building. Although the building includes three rooms, namely the reception room, the conference room A, and the conference room B, these rooms are collectively regarded as a priority order determination area, without distinction from one another. The priority order is determined based on the priority corresponding to the user attribute of one or a plurality of users present in the priority order determination area.

FIG. 6 represents the priority order of the case where the president and the general employee are present in the priority order determination area, and hence the president having the priority of "2" is at the first place and the general employee having the priority of "1" is at the second place. For example, when a VIP newly enters the priority order determination area, the VIP having the priority of "3" comes to the first place, and the president and the general employee are ranked down to the second and the third place, respectively. Thus, "priority order" is updated based on the priority corresponding to the user attribute, each time a user enters the priority order determination area. The updating of the priority status storage unit 12 is performed by the interlocking control calculation unit 3.

Figure 7:
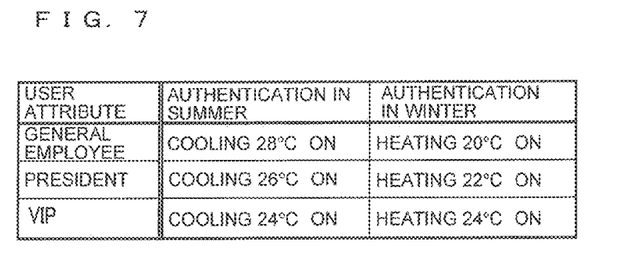
FIG. 7 is a table showing an example of contents of an attribute interlocking database 9 in the central management apparatus 1 in FIG. 1.

FIG. 7 is a table showing an example of contents of the attribute interlocking database 9 in the central management apparatus 1 in FIG. 1.

The attribute interlocking database 9 contains attribute-specific preset temperatures corresponding to the respective user attributes. The attribute-specific preset temperatures are specified for each of a summer season and a winter season. Specifically, for example, the uppermost column in FIG. 7 stipulates that for the user attribute of "general employee" the indoor unit 22 of the relevant room is set to perform a cooling operation at 28 degrees Celsius when the authentication is made (i.e., the staff enters) in summer, and set to perform a heating operation at 20 degrees Celsius when the authentication is made in winter.

Figure 8:
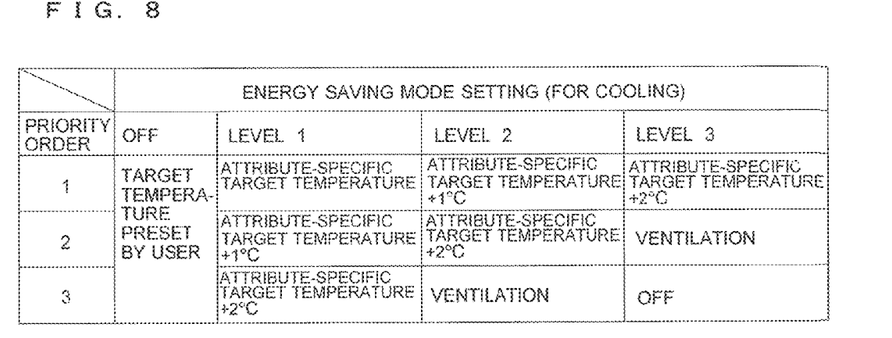
FIG. 8 is a table showing an example of contents in an energy saving mode setting database 10 in the central management apparatus 1 in FIG. 1.

FIG. 8 is a table showing an example of contents in the energy saving mode setting database 10 in the central management apparatus 1 in FIG. 1. FIG. 8 represents the case of the cooling operation.

The energy saving mode setting database 10 contains a plurality of energy saving levels as the energy saving mode. The energy saving levels are classified into three stages, from level 1 to level 3. Among the energy saving levels 1 to 3 the energy saving level 3 provides a highest energy saving effect, and the energy saving effect declines in the order of the energy saving level 2, and the energy saving level 1. In addition, "OFF" in FIG. 8 represents an ordinary state in which the energy saving mode is not specified.

The energy saving level is constituted of a combination of control objectives of the air-conditioning apparatus 20, assigned to each of the ranks of the priority order. The control objectives include "preset temperature", "ventilation", and "OFF (air-conditioning stopped)" of the air-conditioning apparatus 20. For "preset temperature", the temperature based on the attribute-specific preset temperature is specified. For example, when the energy saving mode is set to "energy saving level 2" in the cooling operation, the preset temperature of "attribute-specific preset temperature+1 degree Celsius" is assigned as the control objective, for the user attribute in the first place in priority order. For the user attribute in the second place, the preset temperature of "attribute-specific preset temperature+2 degrees Celsius" is assigned as the control objective. For the user attribute in the third place, "ventilation" is assigned as the control objective.

To be more specific, when the user attribute of the user of the first place is a VIP under the setting of "energy saving level 2", since the attribute-specific preset temperature for the VIP is 24 degrees Celsius as shown in FIG. 7, the preset temperature is set to "24 degrees Celsius+1 degree Celsius", hence 25 degrees Celsius. When the user attribute of the user of the second place is the president, since the attribute-specific preset temperature of the president is 26 degrees Celsius, the preset temperature under the energy saving setting is 26 degrees Celsius+2 degrees Celsius, hence 28 degrees Celsius.

The contents of the databases shown in FIG. 3, FIG. 4, FIG. 5, FIG. 7, and FIG. 8 are registered in advance by the system manager through the setting input device 1A. The energy saving levels of the energy saving mode are also inputted by the system manager through the setting input device 1A.

Figure 9:
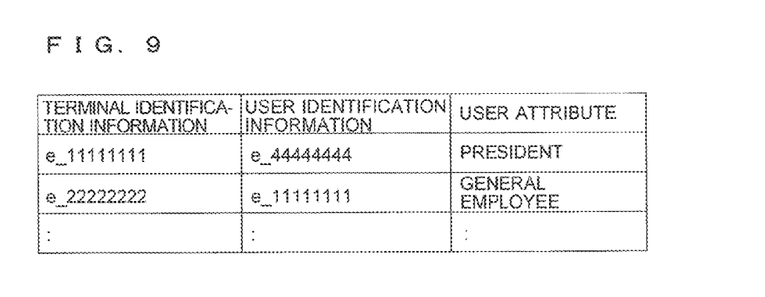
FIG. 9 is a table showing an example of contents of a presence status storage unit 11 in the central management apparatus 1 in FIG. 1.

FIG. 9 is a table showing an example of contents of the presence status storage unit 11 in the central management apparatus 1 in FIG. 1.

The presence status storage unit 11 stores therein presence information composed of the terminal identification information, the user identification information, and the user attribute associated with one another, and such presence information is updated each time a person enters or leaves a room. More specifically, when a user enters a room the presence information of the user is newly registered in the presence status storage unit 11, and when the user leaves the room the presence information is deleted from the presence status storage unit 11. Therefore, for example, which user is in which room, or whether a room is empty can be checked based on the data stored in the presence status storage unit 11. The updating of the presence information in the presence status storage unit 11 is performed by the interlocking control calculation unit 3 based on the entrance-interlocking signal and the exit-interlocking signal provided from the user information input terminal 40.

Figure 10:
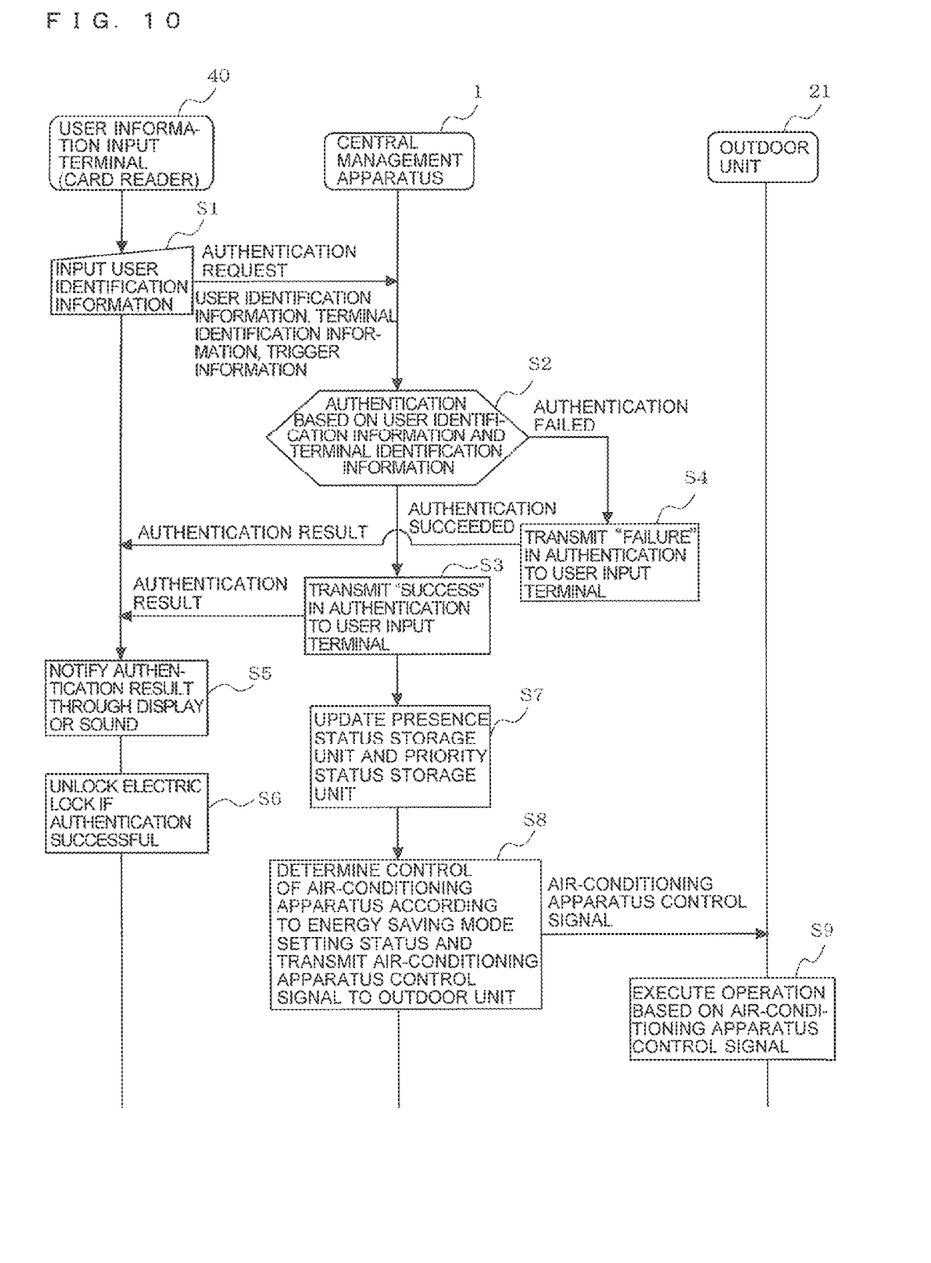
FIG. 10 is a flowchart of an interlocking control by the air-conditioning system according to Embodiment of the present invention.

FIG. 10 is a flowchart of the interlocking control by the air-conditioning system according to Embodiment of the present invention. Referring to FIG. 10, the outline of the interlocking control performed by the air-conditioning system according to Embodiment will be described hereunder. Here, it will be assumed that the energy saving levels and season information indicating whether the current season is summer or winter are registered in advance by the system manage through the setting input device 1A.

Upon entering a room, for example the conference room A, the user inputs the user identification information to the user information input terminal 40 using his/her user information card 30, to unlock the electric lock (S1). Accordingly, the user information input terminal 40 reads from the user information card 30 the user identification information stored therein. Then the user information input terminal 40 transmits the entrance-interlocking signal including the user identification information which has been read, its own terminal identification information, and the trigger information to the central management apparatus 1, as authentication request. In this case, the trigger information is the unlocking signal for the electric lock.

Upon receipt of the authentication request from the user information input terminal 40, the user recognition processing unit 2 of the central management apparatus 1 performs user authentication to determine whether the user may be permitted to enter the room that the user intends to enter, in the case where the trigger information included in the authentication request is the unlocking signal (S2). In this process, the user recognition processing unit 2 looks up the user information database 5 with reference to the user identification information included in the authentication request, and also looks up the user information input terminal database 6 with reference to the terminal identification information included in the authentication request, to thereby perform the authentication according to the result of the reference to the mentioned databases.

To be more specific, the user recognition processing unit 2 first checks whether the user identification information included in the authentication request is contained in the user information database 5. In the case where the user identification information is contained in the user information database 5, the user recognition processing unit 2 identifies the entrance-permitted area stored in association with the user identification information. The user recognition processing unit 2 also looks up the user information input terminal database 6 with reference to the terminal identification information included in the authentication request to thereby identify the area where the user information input terminal 40 identified by the terminal identification information is installed, and checks whether the area is registered as the entrance-permitted area.

In the case where the area identified based on the terminal identification information is registered as the entrance-permitted area, the central management apparatus 1 determines the user authentication as success, and transmits the authentication result that the authentication has succeeded, to the user information input terminal 40 that is the sender of the authentication request (S3). In contrast, in the case where the area identified based on the terminal identification information is not the entrance-permitted area, the central management apparatus 1 transmits the authentication result that the authentication has failed, to the user information input terminal 40 (S4).

The user information input terminal 40 notifies the authentication result from the user recognition processing unit 2 of the central management apparatus 1 to the user, through a display screen or with a tone (S5). In the case where the received authentication result is success, the user information input terminal 40 unlocks the electric lock (S6), but keeps the electric lock closed in the case where the received authentication result is failure.

Upon succeeding in the authentication, the user recognition processing unit 2 of the central management apparatus 1 inputs the user identification information, the terminal identification information, the trigger information, and the information registered in the user information database 5 in association with the user identification information (user attribute), in the interlocking control calculation unit 3.

The interlocking control calculation unit 3 updates the presence status storage unit 11 and the priority status storage unit 12 based on the information inputted by the user recognition processing unit 2 (S7). To be more specific, the interlocking control calculation unit 3 updates the presence status storage unit 11 based on the user identification information, the terminal identification information, and the user attribute information received from the user recognition processing unit 2. The interlocking control calculation unit 3 also updates the priority status storage unit 12 based on the user attribute information received from the user recognition processing unit 2 and the priority information stored in the priority database 8.

Then the interlocking control calculation unit 3 determines the control objective for the air-conditioning apparatus 20 corresponding to the energy saving level currently set, and transmits the air-conditioning apparatus control signal to the outdoor unit 21 (S8). Thus, the interlocking control calculation unit 3 determines the controlling operation to be performed by the air-conditioning apparatus 20, based on the presence status storage unit 11 and the priority status storage unit 12 which have been updated, the season information, the attribute-specific preset temperature, the energy saving level currently set, and the interlocking setting database group 7.

The controlling operation determined as above is performed so as to achieve the control objective with respect to each of the rooms, in other words the control objective with respect to the indoor units 22 installed in the respective rooms, which corresponds to one of the preset temperature, the ventilation (blowing operation), and OFF (air-conditioning stopped). The interlocking control calculation unit 3 transmits the air-conditioning apparatus control signal indicating the room-specific control objective corresponding to each of the rooms (each of the indoor units), to the outdoor unit 21. In other words, the air-conditioning apparatus control signal specifies the control objective to be achieved by the indoor unit 22, with respect to each of the indoor unit numbers. Here, the composition of the air-conditioning apparatus control signal is not limited to the above, but may be composed as desired provided that the air-conditioning apparatus control signal allows each of the indoor units 22 to receive the corresponding control objective.

The outdoor unit 21 operates itself and the corresponding indoor unit 22, in accordance with the received air-conditioning apparatus control signal (S9).

In the case where the user leaves the room, though not included in FIG. 10, the user information input terminal 40 locks the electric lock of the room upon detecting that the user has left. In addition, upon detecting that the user has left the user information input terminal 40 transmits, as described above, the exit-interlocking signal including the user identification information of the user who has left the room and the terminal identification information allocated in advance to the user information input terminal 40, to the central management apparatus 1. The operation of the central management apparatus 1 based on the exit-interlocking signal will be described in details hereunder.

A specific example will be described as follows.

Figure 11:
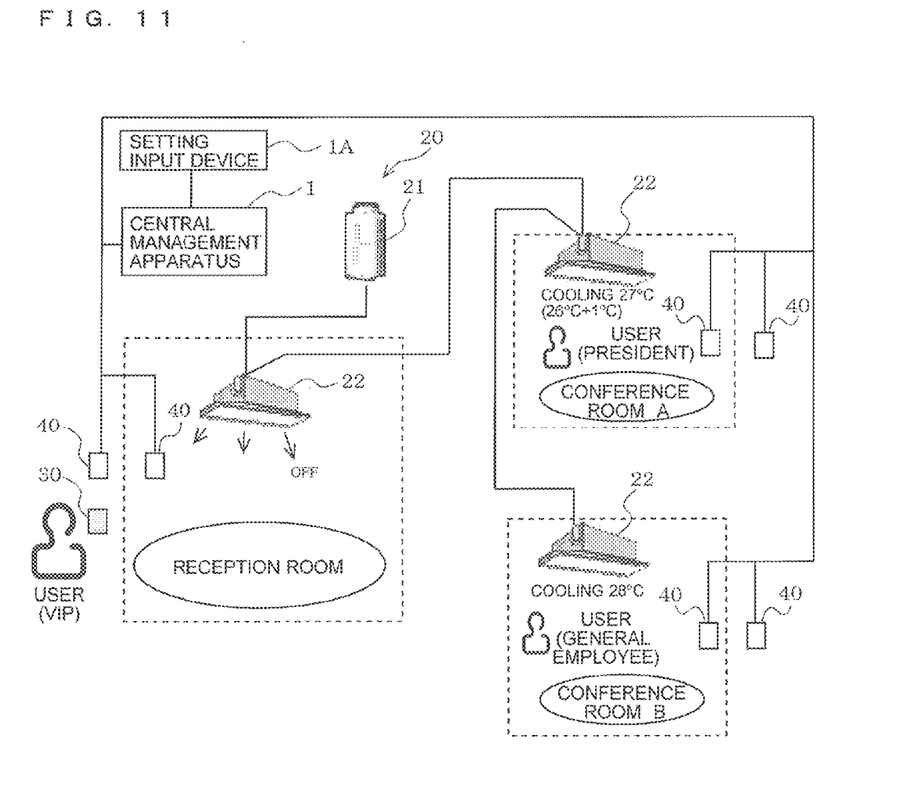
FIG. 11 is a schematic drawing for explaining a specific example.

FIG. 11 is a schematic drawing for explaining the specific example. The description is based on the assumption that a VIP user of higher priority (priority 3) has entered the reception room which has thus far been empty, when only the president (priority 2) is in the conference room A and only the general employee (priority 1) is in the conference room B. It will also be assumed that the cooling operation is being performed under the energy saving mode set to the energy saving level 2.

Figure 12:
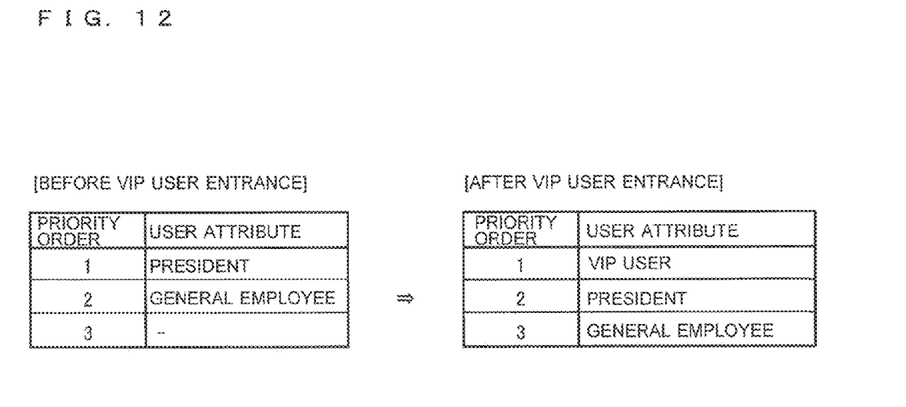
FIG. 12 includes tables showing changes in priority order in the specific example of FIG. 11.
Figure 13:
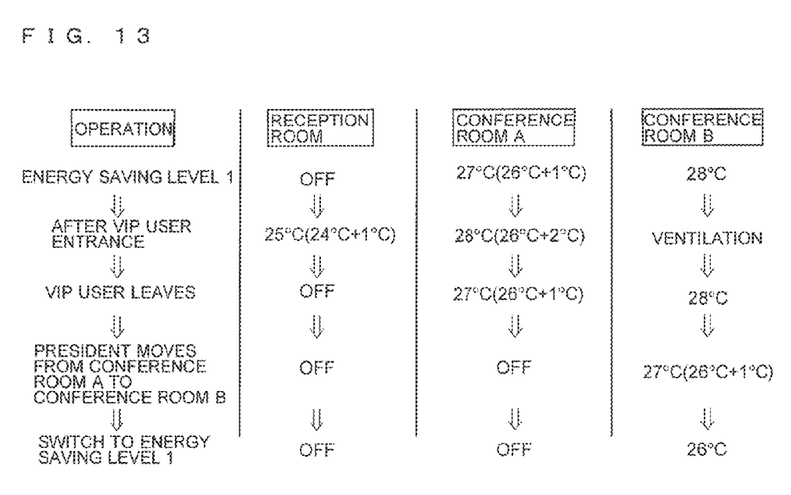
FIG. 13 is a chart showing changes in room-specific control objective of each room in an occasion in the specific example of FIG. 11.

FIG. 12 includes tables showing changes in priority order in the specific example of FIG. 11, in which the table on the left shows the content in the priority status storage unit 12 before the VIP user enters the room, and the table on the right shows the content in the priority status storage unit 12 after the VIP user has entered the room. FIG. 13 is a chart showing changes in room-specific control objective of each room in an occasion in the specific example of FIG. 11.

As stated earlier, the priority order is determined based on the presence status, with respect to the priority order determination area collectively composed of the reception room, the conference room A, and the conference room B in the building, not with respect to each room. The general employee (priority 1) and the president (priority 2) are present in the priority order determination area, before the VIP user enters the reception room. Accordingly, the president is in the first place and the general employee is in the second place in priority order, as shown in the table on the left in FIG. 12.

At this point, therefore, the preset temperatures of the respective rooms are set as follows. Since the reception room is empty, the indoor unit 22 is OFF and the preset temperature is unspecified. In the conference room A only the president, who is in the first place in priority order, is present and therefore the preset temperature of the conference room A is set to 27 degrees Celsius (26 degrees Celsius+1 degree Celsius) under the cooling operation. Since only the general employee, who is in the second place in priority order, is in the conference room B, theoretically the preset temperature is to be set to "28 degrees Celsius+2 degrees Celsius", hence 30 degrees Celsius. However, an upper limit is set for the preset temperature in the cooling operation, which is 28 degrees Celsius in this example, and therefore the preset temperature of the conference room B is limited to 28 degrees Celsius.

When the VIP user enters the reception room in the mentioned circumstance, the priority order is changed, as shown in the table on the right in FIG. 12, such that the VIP comes to the first place, the president falls to the second place, and the general employee falls to the third place. Accordingly, the control objective (preset temperature) for the VIP is set to 25 degrees Celsius under the cooling operation, which is higher by 1 degree Celsius than 24 degrees Celsius which is the attribute-specific preset temperature for VIP. The control objective (preset temperature) for the president is set to 28 degrees Celsius (26 degrees Celsius+2 degrees Celsius) under the cooling operation. In addition, the control objective for the general employee is set to ventilation. Therefore, the temperature setting is changed from OFF to 25 degrees Celsius under the cooling operation in the reception room where the VIP has entered, from 27 degrees Celsius to 28 degrees Celsius under the cooling operation in the conference room A, and from 28 degrees Celsius under the cooling operation to ventilation in the conference room B.

When the VIP user leaves the reception room afterwards, in other words when the VIP user moves out of the priority order determination area, the ranks of other users are elevated and return to the state shown in the table on the left in FIG. 12. Accordingly, the control objective (preset temperature) for the president is set to 27 degrees Celsius, and the control objective (preset temperature) for the general employee is set to 28 degrees Celsius. In other words, the temperature setting is changed from 28 degrees Celsius to 27 degrees Celsius in the conference room A where the president is present, and from ventilation to 28 degrees Celsius in the conference room B where the general employee is present. The indoor unit 22 in the reception room is turned OFF, since the reception room is now empty.

It will now be assumed that a further change takes place, such that the president has left the conference room A and entered the conference room B. The priority order is determined, as stated above, based on the presence status in the priority order determination area as a whole. Accordingly, the priority order remains unchanged as shown in the table on the left in FIG. 12, regardless that the president has moved to the conference room B, and the control objectives (preset temperatures) respectively specified for the president and the general employee also remain unchanged. However, the presence status of each room has changed. The conference room A becomes empty because the president has left, and hence the indoor unit 22 in the conference room A is turned OFF. In the conference room B, since the president having the higher priority than the general employee has entered, the control objective for the president in the first place in priority order 1 is preferentially selected, so that the temperature setting for the conference room B is changed from 28 degrees Celsius to 27 degrees Celsius under the cooling operation.

Further, in the case where the system manager has switched the energy saving mode from the energy saving level 2 to the energy saving level 1, for example because the energy saving target has been accomplished, the preset temperature of the conference room B, where the president and the general employee are currently present, is changed from 27 degrees Celsius to 26 degrees Celsius, which is the attribute-specific preset temperature of the president.

To thus determine the control objective for each of the rooms according to the highest user attribute, it is preferable to utilize the presence status stored in the presence status storage unit 11. Specifically, first the user attribute of one or more users may be identified with respect to each room. Then the control objective specified for the user attribute of the highest priority order, among the user attributes of the one or more users identified with respect to each room, may be determined as the room-specific control objective for the relevant room.

When the user leaves the room, the user information input terminal 40 transmits the exit-interlocking signal including the user identification information of the user who has left and the terminal identification information to the central management apparatus 1, as described earlier. Accordingly, the interlocking control calculation unit 3 of the central management apparatus 1 determines the controlling operation to be performed by the air-conditioning apparatus 20, based on the exit-interlocking signal. To be more specific, the interlocking control calculation unit 3 updates the priority order in the priority order determination area based on the exit-interlocking signal, updates the room-specific control objective for each room based on the updated priority order, and transmits the air-conditioning apparatus control signal indicating the updated room-specific control objective to the outdoor unit 21. In addition, upon detecting that a room has become empty according to the exit-interlocking signal, the interlocking control calculation unit 3 turns OFF the indoor unit 22 of the room.

As described thus far, the configuration according to Embodiment allows the interlocking control of the air-conditioning apparatus 20 to be realized taking into account both the user attribute and the energy saving level. Therefore, the air-conditioning system can be obtained that allows the interlocking control, suitable for each user, of the air-conditioning apparatus 20, while providing the energy saving effects.

Although the air-conditioning apparatus 20 is set to work for a plurality of rooms in Embodiment, the present invention is also applicable to the case where the air-conditioning apparatus 20 is set to work for a single room in which one or a plurality of indoor units 22 are installed. In this case, there is no need to specify the priority order, and first the user attribute of the one or more users in the room is identified based on the user information database 5. Then the priority of the identified user attribute of the one or more users is identified based on the interlocking setting database group 7, to thereby identify the attribute-specific setting information corresponding to the user attribute having the highest priority. Thereafter, the control objective may be determined according to the energy saving level currently set based on the identified attribute-specific setting information and the energy saving mode setting database 10, and the air-conditioning apparatus control signal indicating the determined control objective may be set, to the air-conditioning apparatus 20.

Although the user information input terminal 40 is provided on the entrance side and the exit side of the door of each room in Embodiment, the user information input terminal 40 may be at least provided on the entrance side, so as to identify the person who has entered the room. In addition, although the user information input terminal 40 is configured to lock and unlock the electric lock according to the user authentication result in Embodiment, such a function is not requisite and may be omitted if so desired.

In addition, although the user information input terminal 40 (card reader) serves as the trigger device in Embodiment, the trigger device is not limited to the user information input terminal 40. For example, in the case where the room in which the indoor unit 22 is installed is an operation room where a plurality of seats for users are provided, the personal computers (hereinafter, PC) provided for the respective seats may be employed as the trigger device. In this case, an ID number may be allocated in advance to each PC to use the PC ID number as the user identification information, so that when the PC is turned ON the PC ID number (user identification information) may be inputted from the PC to the central management apparatus 1, as an event corresponding to the entrance of the user in the foregoing description. In addition, the turning OFF of the PC may be regarded as an event corresponding to the leaving of the user from the room in the foregoing description.

Further, although the priority order determination area is collectively composed of the plurality of rooms (reception room, conference room A, and conference room B) in the building in Embodiment, the priority order determination area may encompass the entirety of the building, and the system manager may modify the setting depending on the structure of each building.

The invention claimed is:

1. An air-conditioning system comprising:
an air-conditioning apparatus that performs air-conditioning of a room;
an entrance-interlocking trigger device that detects entrance of a user into the room and transmits an entrance-interlocking signal including user identification information for identifying the user; and
a central management apparatus that receives the entrance-interlocking signal and controls the air-conditioning apparatus based on the entrance-interlocking signal, wherein the central management apparatus includes:
a user information database storing user attributes associated with the user identification information;
an interlocking setting database group including a priority database storing priority levels associated with the respective user attributes, an attribute interlocking database storing attribute-specific preset temperatures associated with the respective user attributes, and an energy saving mode setting database storing one or more energy saving levels each specifying a preset temperature of the room based on the attribute-specific preset temperature as a control objective of the air-conditioning apparatus;
a setting input unit for selecting the energy saving level; and
an interlocking control calculation unit; and
an exit-interlocking trigger device that detects exiting of the user from the room and transmits an exit-interlocking signal including the user identification information for identifying the user, and
the interlocking control calculation unit is configured to:
identify, upon detecting new entrance of a user into the room based on the entrance-interlocking signal from the entrance-interlocking trigger device, the user attribute of each of one or more users present in the room including the user who has newly entered the room based on the user information database;
determine, based on the interlocking setting database group, the priority level of each of the one or more user attributes that have been identified, and identify the attribute-specific setting information corresponding to the user attribute of a highest priority among the priority levels that were determined, thereby determining the control objective according to the energy saving level selected by the setting input unit;
recognize user presence status of the room and identify the user attribute of each of the one or more users in the room;
designate the control objective allocated to the user attribute of a highest rank of a priority order among the one or more user attributes, as the room-specific control objective of the room; and
transmit an air-conditioning apparatus control signal indicating the determined control objective, to the air-conditioning apparatus,
wherein the interlocking control calculation unit is configured to (i) update, upon receipt of the exit interlocking signal, the priority level among the one or more user attributes of the one or more users in the room, then (ii) update the room-specific control objective of the room based on the updated priority level among the one or more user attributes identified with respect to the room, and then (iii) transmit an air-conditioning apparatus control signal indicating the updated room-specific control objective, to the air-conditioning apparatus.

2. The air-conditioning system of claim 1,
wherein the interlocking control calculation unit is further configured to, upon receipt of the exit-interlocking signal:
identify the user who has left the room based on the user identification information included in the exit-interlocking signal upon receipt of the exit-interlocking signal, and identify the user attribute of each of one or more users present in the room except for the user who has left the room, based on the user information database;

update the control objective based on the user attribute having a highest priority among the one or more user attributes identified; and transmit an air-conditioning apparatus control signal indicating the updated control objective, to the air-conditioning apparatus.

3. An air-conditioning system comprising:

an air-conditioning apparatus including a plurality of indoor units that perform air-conditioning of a plurality of rooms; and a plurality of entrance-interlocking trigger devices respectively provided at entrances of the plurality of rooms, and configured to detect entrance of a user into the respective rooms and transmit an entrance-interlocking signal including user identification information for identifying the user and terminal identification information representing an identification number of the entrance-interlocking trigger device; and a central management apparatus that receives the entrance-interlocking signal and controls the air-conditioning apparatus based on the entrance-interlocking signal, wherein the central management apparatus includes:

a user information database storing user attributes associated with the user identification information;

an interlocking setting database group including a priority database storing priority levels associated with the respective user attributes, an attribute interlocking database storing attribute-specific preset temperatures associated with the respective user attributes, and an energy saving mode setting database storing one or more energy saving levels in each of which a combination of control objectives of the air-conditioning apparatus allocated to each rank of priority order determined based on the priority level is specified, the control objectives each including at least a preset temperature of the room based on the attribute-specific preset temperature;

a setting input unit for selecting the energy saving level;

an interlocking control calculation unit; and an exit-interlocking trigger device that detects exiting of a user from the room and transmits an exit-interlocking signal including the user identification information for identifying the user, and the interlocking control calculation unit is configured to:

identify, upon detecting new entrance of a user into a priority order determination area collectively composed of the plurality of rooms based on the entrance-interlocking signal from the entrance-interlocking trigger device, the room that the user has entered based on the terminal identification information included in the entrance-interlocking signal, and identify the user attribute of each of one or more users present in the priority order determination area including the user who has newly entered the room based on the user information database;

determine, based on the interlocking setting database group, a rank of priority order of each of the one or more user attributes identified, and allocate the control objective according to the energy saving level selected by the setting input unit based on the attribute-specific preset temperature corresponding to the user attribute, to the user attribute of each rank;

recognize user presence status of each of the plurality of rooms and identify the user attribute of each of the one or more users in the room with respect to each of the rooms;

designate a control objective allocated to the user attribute of a highest rank of the priority order among the one or more user attributes identified with respect to each of the rooms, as the room-specific control objective of the room; and transmit an air-conditioning apparatus control signal indicating the room-specific control objective determined with respect to each of the plurality of rooms, to the air-conditioning apparatus, wherein the interlocking control calculation unit is configured to (i) update, upon receipt of the exit-interlocking signal, the priority order in the priority order determination area, (ii) update the room-specific control objective of each of the rooms based on the updated priority order among the one or more user attributes identified with respect to each of the rooms, and (iii) transmit an air-conditioning apparatus control signal indication the updated room-specific control objective, to the air-conditioning apparatus.

4. The air-conditioning system of claim 3, wherein the interlocking control calculation unit updates, upon detecting a movement of a user from a room to another in the priority order determination area based on the entrance-interlocking signal and the exit-interlocking signal, the room-specific control objective of each of the plurality of rooms according to a change in user presence status of each of the rooms, without updating the priority order in the priority order determination area, and transmits an air-conditioning apparatus control signal indicating the updated room-specific control objective, to the air-conditioning apparatus.

5. The air-conditioning system of claim 3, wherein the entrance-interlocking trigger device is configured to: unlock an electric lock of a door of the room for which the entrance-interlocking trigger device is provided; and generate, upon detecting entrance of a user into the room for which the entrance-interlocking trigger device is provided, an unlocking signal for the electric lock and transmit the entrance-interlocking signal including the unlocking signal to the central management apparatus, and the central management apparatus determines, upon receipt of the entrance-interlocking signal including the unlocking signal, whether the room identified by the terminal identification information included in the entrance-interlocking signal is in an entrance-permitted area of the user identified by the user identification information, and transmits an authentication result indicating success in authentication to the entrance-interlocking trigger device that has transmitted the entrance-interlocking signal, in the case where the room is determined to be in the entrance-permitted area of the user, and the entrance-interlocking trigger device unlocks the electric lock upon receipt of the authentication result indicating success in authentication from the central management apparatus.

6. The air-conditioning system of claim 5, wherein the exit-interlocking trigger device locks the electric lock of the room for which the entrance-interlocking trigger device is provided, upon detecting exiting of the user from the room.

7. The air-conditioning system of claim 2,
wherein upon detecting that a room has become empty based on the exit-interlocking signal, the interlocking control calculation unit turns OFF an indoor unit of the room.

8. The air-conditioning system of claim 1,
wherein the control objective of the air-conditioning apparatus includes at least one of ventilation and turning OFF the air-conditioning apparatus, in addition to the preset temperature of the room.

9. A central management apparatus of an air-conditioning system including an air-conditioning apparatus that performs air-conditioning of a room, an entrance-interlocking trigger device that detects entrance of a user into the room and transmits an entrance-interlocking signal including user identification information for identifying the user, and the central management apparatus that receives the entrance-interlocking signal and controls the air-conditioning apparatus based on the entrance-interlocking signal, the central management apparatus comprising:
    a user information database storing user attributes associated with the user identification information;
    an interlocking setting database group including a priority database storing priority levels associated with the respective user attributes, an attribute interlocking database storing attribute-specific preset temperatures associated with the respective user attributes, and an energy saving mode setting database storing one or more energy saving levels each specifying a preset temperature of the room based on the attribute-specific preset temperature as a control objective of the air-conditioning apparatus;
    a setting input unit for selecting the energy saving level; and
    an interlocking control calculation unit; and
    an exit-interlocking trigger device that detects exiting of the user from the room and transmits an exit-interlocking signal including the user identification information for identifying the user,
    wherein the interlocking control calculation unit is configured to:
    identify, upon detecting new entrance of a user into the room based on the entrance-interlocking signal from the entrance-interlocking trigger device, the user attribute of each of one or more users present in the room including the user who has newly entered the room based on the user information database;
    determine, based on the interlocking setting database group, the priority level of each of the one or more user attributes that have been identified, and identify the attribute-specific setting information corresponding to the user attribute of a highest priority among the priority levels that were determined, thereby determining the control objective according to the energy saving level selected by the setting input unit;
    recognize user presence status of the room and identify the user attribute of each of the one or more users in the room;
    designate the control objective allocated to the user attribute of a highest rank of a priority order among the one or more user attributes, as the room-specific control objective of the room; and
    transmit an air-conditioning apparatus control signal indicating the determined control objective, to the air-conditioning apparatus,
    wherein the interlocking control calculation unit is configured to (i) update, upon receipt of the exit-interlocking signal, the priority level among the one or more user attributes of the one or more users in the room, then (ii) update the room-specific control objective of the room based on the updated priority level among the one or more user attributes identified with respect to the room, and then (iii) transmit an air-conditioning apparatus control signal indicating the updated room-specific control objective, to the air-conditioning apparatus.

10. A central management apparatus of an air-conditioning system including an air-conditioning apparatus including a plurality of indoor units that perform air-conditioning of a plurality of rooms, a plurality of entrance-interlocking trigger devices configured to detect entrance of a user into the respective rooms and transmit an entrance-interlocking signal including user identification information for identifying the user and terminal identification information representing an identification number of the entrance-interlocking trigger device, and the central management apparatus that receives the entrance-interlocking signal and controls the air-conditioning apparatus based on the entrance-interlocking signal, the central management apparatus comprising:
    a user information database storing user attributes associated with the user identification information;
    an interlocking setting database group including a priority database storing priority levels associated with the respective user attributes, an attribute interlocking database storing attribute-specific preset temperatures associated with the respective user attributes, and an energy saving mode setting database storing one or more energy saving levels in each of which a combination of control objectives of the air-conditioning apparatus allocated to each rank of priority order determined based on the priority level is specified, the control objectives each including at least a preset temperature of the room based on the attribute-specific preset temperature;
    a setting input unit for selecting the energy saving level;
    an interlocking control calculation unit; and
    an exit-interlocking trigger device that detects exiting of a user from the room and transmits an exit-interlocking signal including the user identification information for identifying the user,
    wherein the interlocking control calculation unit is configured to:
    identify, upon detecting new entrance of a user into a priority order determination area collectively composed of the plurality of rooms based on the entrance-interlocking signal from the entrance-interlocking trigger device, the room that the user has entered based on the terminal identification information included in the entrance-interlocking signal, and identify the user attribute of each of one or more users present in the priority order determination area including the user who has newly entered the room based on the user information database;
    determine, based on the interlocking setting database group, a rank of priority order of each of the one or more user attributes identified, and allocate the control objective according to the energy saving level selected by the setting input unit based on the attribute-specific preset temperature set corresponding to the user attribute, to the user attribute of each rank;

recognize user presence status of each of the plurality of rooms and identify the user attribute of each of the one or more users in the room with respect to each of the rooms;

designate the control objective allocated to the user attribute of a highest rank of the priority order among the one or more user attributes identified with respect to each of the rooms, as the room-specific control objective of the room; and transmit an air-conditioning apparatus control signal indicating the room-specific control objective determined with respect to each of the plurality of rooms, to the air-conditioning apparatus, wherein the interlocking control calculation unit is configured to (i) update, upon receipt of the exit-interlocking signal, the priority order in the priority order determination area, (ii) update the room-specific control objective of each of the rooms based on the updated priority order among the one or more user attributes identified with respect to each of the rooms, and (iii) transmit an air-conditioning apparatus control signal indicating the updated room-specific control objective, to the air-conditioning apparatus.

11. The air-conditioning system of claim 3,
wherein upon detecting that a room has become empty based on the exit-interlocking signal, the interlocking control calculation unit turns OFF the indoor unit of the room.

12. The air-conditioning system of claim 3,
wherein the control objective of the air-conditioning apparatus includes at least one of ventilation and turning OFF the air-conditioning apparatus, in addition to the preset temperature of the room.

\* \* \* \* \*